United States Patent [19]

Neumann

[11] 4,215,976
[45] Aug. 5, 1980

[54] TURBINE-IMPELLER PUMP FOR USE IN GEOTHERMAL ENERGY RECOVERY SYSTEMS

[75] Inventor: Borys Neumann, Convent Station, N.J.

[73] Assignee: Worthington Pump, Inc., Mountainside, N.J.

[21] Appl. No.: 904,558

[22] Filed: May 10, 1978

[51] Int. Cl.³ ............... F01D 3/02; F04B 17/00; F04B 35/00
[52] U.S. Cl. ..................... 417/409; 415/93; 415/95; 415/101
[58] Field of Search ........... 417/405, 406, 408, 409; 415/93, 95, 101, 102, 103

[56] References Cited

U.S. PATENT DOCUMENTS

| | | | |
|---|---|---|---|
| 874,356 | 12/1907 | Carnt et al. | 415/102 |
| 969,869 | 9/1910 | Hodgkinson | 415/93 |
| 1,811,948 | 6/1931 | Loomis et al. | 417/409 X |
| 2,083,167 | 6/1937 | Lamere | 17/405 X |
| 2,516,822 | 7/1950 | Yates | 417/406 |
| 2,726,606 | 12/1955 | Davidson | 417/408 X |
| 3,087,434 | 4/1963 | Reichenbacher | 415/112 X |
| 3,960,468 | 6/1976 | Boorse et al. | 417/424 |

Primary Examiner—Michael Koczo
Attorney, Agent, or Firm—Daniel H. Bobis

[57] ABSTRACT

A turbine impeller pump particularly for use in a geothermal pumping system has a casing with a hollow cylindrical stator or axle fixedly connected in the longitudinal axis thereof which stator or axle defines a flow passage for motive fluid and enables a rotor assembly to be rotatably mounted thereon. The rotor has spaced composite impellers which lie in assembled position in medially disposed pumping chambers in the casing having a suction inlet for fluid to be pumped and a discharge outlet for pumped fluid. The rotor further has first and second multi-stage axial flow driving assemblies disposed on opposite sides of the spaced composite impellers so that the motive fluid for driving the same can be passed to the respective adjacent composite impellers and delivered with the fluid being pumped. The oppositely disposed driving assemblies are positioned to substantially balance the axial forces acting across the rotor and a thrust bearing assembly is operatively associated with the rotor for overcoming any residual axial forces acting along the rotor during operation of the turbine-impeller pump. A lubrication system is provided for lubricating the thrust bearing assembly.

Additionally, a geothermal pumping system utilizing a turbine-impeller pump as above described includes, a recirculating pumping assembly for recirculating a portion of the fluid being pumped to provide motive fluid for operating the respective first and second multi-stage axial flow driving assemblies. The lubrication system is preferably located at a point remote from the turbine-impeller pump.

15 Claims, 5 Drawing Figures

TURBINE-IMPELLER PUMP FOR USE IN GEOTHERMAL ENERGY RECOVERY SYSTEMS

BACKGROUND OF THE INVENTION

This invention relates generally to geothermal energy recovery systems and more particularly to a turbine-impeller pump for use in such system.

Except where heated brine has risen of its own accord from the depths to the surface of the earth, the recovery of thermal energy from such heated brine has heretofore been non-competitive with the more conventional sources of energy because of the costs and multiple problems which attach to installations of systems and the related equipment for accomplishing such recovery.

However this source of thermal energy has now become more important because of the increasing costs of conventional forms of energy and therefore the methods of recovering such energy are now being investigated more thoroughly.

In the prior art various types of recovery systems are already known. These systems are generally classified into the following:

1. Air lift systems in which compressed air is injected into the hot brine well which expands and reduces the weight or density of the mixture therein sufficiently to raise the hot brine from the well. These systems are inefficient and require separation of air and brine after the heated brine is raised to the surface.

2. Deep well pumps of the multi-stage bowl type which are directly driven from the surface provide high efficiency in the order of about 80% depending on the size of the unit but there are limitations to such installations because of alignment, expansion, distortion, corrosion and erosion problems.

3. Eductor pumping of hot brine is feasible because there are no rotating elements but these systems are limited as to depth because of the pressures and velocities required. Further the efficiency of these systems is low being in the order of 30%.

4. Submersible electric motor driven pumps have high efficiency in the order of 80% but these systems have sealing problems in respect to the electrical cables due to erosion and temperature damage to the insulation because of the hot brine being pumped.

It is also known that water at the temperature which exist in the acqua perin is capable of dissolving and holding in solution large amounts of solids such as sodium, barium and calcium chloride and sulphates, and minerals such as boron, arsenic, magnesium, etc. The dissolved salts and minerals can reach levels as high as 20 to 30% by weight of these hot brine solutions. Such concentrated hot brine solutions can create major problems to recovery apparatus and systems because they are extremely corrosive and erosive damaging blades, vanes and nozzles of rotating equipment, and further percipitate on the inside of bores, openings, pipes, and collecting chambers of a recovery system and restrict flow of the fluid through such equipment and the system.

Thus, the equipment and systems must not only be capable of moving the hot concentrated brine from whatever depths the same is located but additionally must be capable of handling the fluid withoug damage due to corrosion, erosion, scaling and other problems associated with this type of fluid.

This will require the use of special materials in the equipment or in the systems for such geothermal energy recovery.

In any such equipment and systems, it is preferable to maintain the hot brine in the liquid phase to reduce the precipitation of solids and further to permit return or reinjection of the brine solution; after heat has been recovered therefrom; into the site area adjacent to the area of the supply walls, to eliminate environmental problems which the removal of such hot brine may cause.

The present invention provides an improved geothermal recovery system as it utilizes a turbine-impeller pump which is a shaftless arrangement not subject to thermal distortion. It is hydraulically balanced having a rotor with spaced composite impellers and oppositely disposed driving assemblies so that thrust forces are negligible and can by reason of the composite impellers be driven by the same hot brine fluid medium being pumped which is recirculated from the discharge outlet for the system by a driving pump, at the surface, convenient to the recovery well. The turbine-impeller pump can be placed at any depths the speed is easily regulated as a function of the pressure required for delivering the hot brine from the depth of the earth, speed regulation being a function of the pressure at which the driving medium is supplied to the turbine portion of the turbine-impeller pump.

Further the geothermal energy recovery system utilizing a turbine-impeller pump in accordance with the present invention by reason of its simplicity of structure has relatively low installation cost, ease of regulation, and by reason of its hydraulic balance reduced maintenance.

It is further noted that the geothermal energy recovery system utilizing a turbine-impeller pump in accordance with the present invention will have exceptionally good draw down characteristics as the spaced composite impellers on the rotor of the turbine-impeller pump will permit the hot brine to be drawn to a relatively low level in a supply well during periods of peak load operation and will permit the hot brine to replenish itself from the perculating fluids in the earth during periods when the system is operating at low load requirements.

SUMMARY OF THE INVENTION

Thus the present invention covers a turbine-impeller pump adapted more particular for use in a geothermal energy recovery system comprising, casing means defining medially disposed spaced pumping chambers having, a suction inlet, and a discharge outlet, a hollow cylindrical axle means fixedly connected in the longitudinal axis of said casing defines a motive fluid passage therethrough, a rotor mounted for free rotation about said axle includes, spaced composite impellers thereon which in the assembled position of the rotor are disposed respectively in one of said space pumping chambers, a first multi-stage axial flow driving assembly on one side of said spaced composite impellers and a second multistage axial flow driving assembly on the opposite side of said spaced composite impellers to provide a hydraulically balanced rotor, inlet means for motive fluid connected to said casing for delivering one portion of the motive fluid to the first driving assembly and another portion of the fluid through the motive fluid passage in the axle to the second driving assembly, and said first and second driving assembly disposed so that the motive fluid thereto is delivered to an adjacent one of the spaced composite impellers for discharge with the fluid being pumped.

Additionally, the turbine-impeller pump as above described with a thrust bearing assembly to balance the residual axial thrust forces acting in the pump, and a lubrication system for lubricating said thrust bearing assembly.

Additionally, a geothermal recovery system utilizing in combination the turbine-impeller pump above described in a supply well casing with an outer column and an inner column concentric to the outer column to define a main discharge outlet for the system in communication with the discharge outlet for the turbine-impeller pump, a recirculating pumping system for recirculating a portion of the fluid being discharged through the main discharge outlet to provide the motive fluid for driving the first and second multi-stage axial flow driving assemblies, and a lubrication system adjacent the upper end of the supply well casing including, a pump, and a connecting conduit for delivering lubricating fluid to the thrust bearing assembly for said turbine-impeller pump.

Accordingly, it is an object of the present invention to provide a turbine-impelelr pump having a center axle fixed thereon and spaced pumping and driving assemblies so that the turbine-impeller pump will be substantially hydraulically balanced during the operation thereof.

It is another object of the present invention to provide a turbine-impeller pump having a hollow cylindrical center axle w which provide means for mounting a rotor thereon with spaced pumping and driving assemblies so that the rotor is hydraulically balanced when in operation, the inlet ends of the driving assemblies being disposed at opposite ends, and motive fluid being deliverable directly to the inlet end of the driving assemblies at one end of the pump and through a motive fluid passage in the cylindrical axle to the inlet end of the other of said driving assemblies at the opposite end of the pump.

It is another object of the present invention to provide a turbine-impeller pump having balanced opposed pumping and driving assemblies on a rotor mounted for free rotation on a central axle so that only residual axial thrust must be balanced by suitable thrust bearing means thereon.

It is still another object of the present invention to provide a geothermal energy recovery system which utilizes a turbine-impeller pump in accordance with the present invention.

Other objects and advantages of the invention including the basic design and the nature of the improvements thereon will appear from the following description taken in conjunction with the following drawings, in which.

Figure 1:
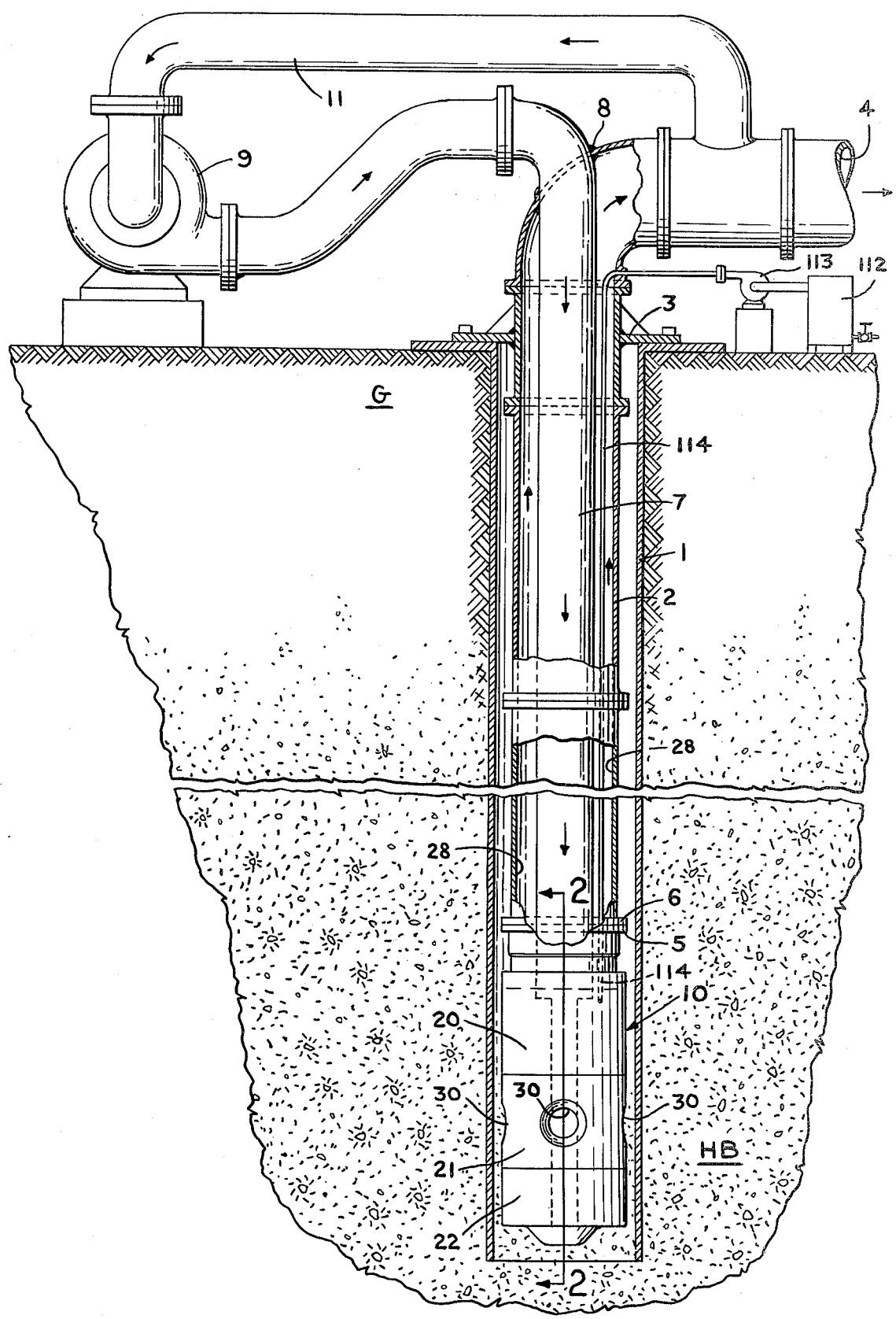
FIG. 1 is a schematic view of a geothermal energy recovery system utilizing a turbine-impeller pump in accordance with the present invention.

Referring to the drawings FIG. 1 shows one system for recovery geothermal energy from a hot brine well utilizing a turbine-impeller pump in accordance with the present invention.

Thus a conventional well casing 1 is sunk into the ground or earth G in a geothermal energy area or field to develop a well having hot brine designated HB therein from which thermal energy can be recovered. Such wells are known to be located at varying depths, shallow wells being approximately at depths of 200' and deep wells down in excess of 5,000'.

Mounted in the well casing 1 is an outer pump column pipe 2 which is connected to extend through a combined support and seal member generally designated 3 which is located at the point where the well casing 1 reaches the surface of the ground.

Figure 2:
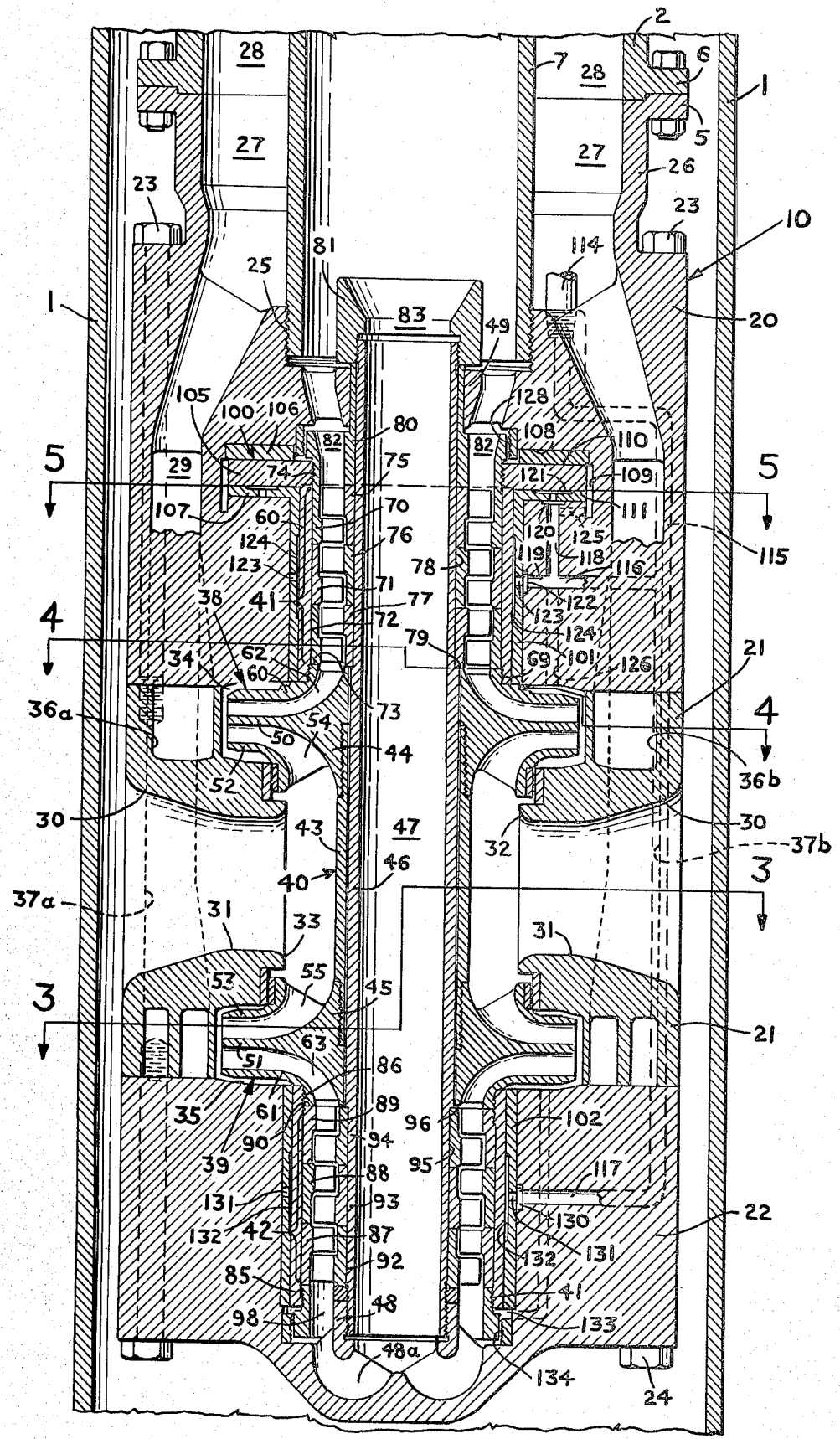
FIG. 2 is a vertical cross-section through the turbine-impeller pump shown in FIG. 1.
Figure 3:
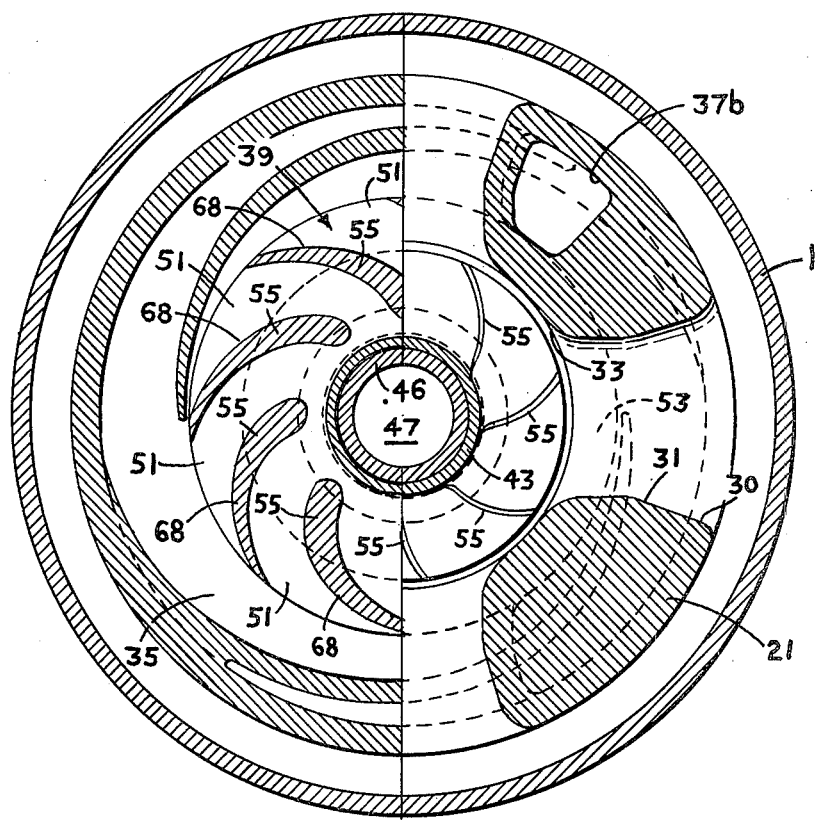
FIG. 3 is a horizontal cross-section taken on line 3—3 of FIG. 2 showing the upper pumping chamber and discharge passages.

The placing and use of such column pipe arrangements for shallow or deep wells are well known to those skilled in the art and therefore are not more fully described herein.

Where the outer column pipe 2 reaches the above ground point, a main discharge 4 is provided for delivering hot brine generally to heat exchanger apparatus, not shown, which is pumped through the outer column pipe 2 from the turbine-impeller pump generally designated 10, which is connected by flange 5 to a lower flange 6 at the lowermost end of the outer column pipe 2 as is shown in FIGS. 1 and 2 of the drawings.

The turbine-impeller pump 10 is driven hydraulically and the motive fluid for this purpose is obtained by recirculating and pressurizing a portion of the hot brine delivered from the main discharge 4.

Thus, an inner column pipe 7 for delivering motive fluid is mounted and extends along the vertical axis of the outer column pipe 2 in which it is connected by any suitable means as at 8. The lower end of the inner conduit 7 is connected to the turbine-impeller pump 10 as hereinafter more fully described and the upper end extends from the outer column pipe 2 at the surface where it connects to the discharge side of a pump 9.

Pump 9 is preferably located adjacent the point where the outer column pipe 2 exits from the well casing 1 and has its suction side connected to one end of a connecting line or conduit 11 which is connected at the end remote therefrom to the outer column pipe 2 at a point adjacent the main discharge outlet 4 so that the same hot brine being pumped from the hot brine well HB by the turbine-impeller pump 10 will be recirculated from connecting line or conduit 11, by pump 9 to the inner column pipe 7 which delivers this portion of the hot brine at the required pressure to the turbine-impeller pump 10 for operating the same.

Pump 9 may be any form of conventional, single or multi-stage centrifugal pump that can supply the hot brine motive fluid to the turbine-impeller pump 10 at the pressures for driving the turbine-impeller pump 10 at the particular depth as may be required. It will be understood that the variations in pressure required for wells of various characteristics will be obtained either by speed variation of pump 9, and by change in the selected pump as to the number of stages thereof, or by change in the type of pump used.

The turbine-impeller pump 10 in accordance with the present invention is particularly characterized by the fact that there is no line shaft required for the driving of the pump, the pump is hydraulically balanced so that the residual axial thrust is predictable, and the speed regulation thereof can be infinitely varied as a function of the pressure of the motive fluid for driving the turbine-impeller pump.

As a result of the shaftless arrangement there are no alignment problems, the thermal distortion of the well casing or outer pump casing and inner pump casing do not affect the operation of the turbine-impeller pump, and the limited number of moving parts, bearings and seals, and the simplicity of mounting the same facilitate and reduce maintenance on this pump.

Turbine-impeller pumps in accordance with the present invention can be sized so as to permit single stage operation within the 13" to 16" diameter sizing of conventional well casings.

Thus referring to FIGS. 2, 3, 4 and 5 the turbine-impeller pump is shown as having an upper casing 20, a middle or central casing 21, and a lower casing 22. Upper casing 20 is connected to the middle casing 21 by upper tie-bolt 23 and lower casing 22 is connected to the middle casing 21 by lower tie-bolts 24.

The inner column pipe 7 is connected by threaded means 25 to the upper casing 20 concentric to the vertical axis of pump 10. The upper flange 5 which connects the turbine-impeller pump 10 to the lower flange 6 of the outer column pipe 2 is formed at the upper end of an annular section 26 on upper casing 20 which lies concentric to the inner column pipe 7 so as to form an annular discharge outlet 27 between the inner column pipe 7 and the annular section 26 for the hot brine being pumped by turbine-impeller pump 10 from the hot brine well HB.

The annular discharge outlet 27 communicates with the annular passage 28 formed between the inner column pipe 7 and the outer column pipe 2 which annular passage in turn connects with the main discharge outlet 4 for delivering the hot brine from the geothermal energy recovery system.

The central or middle casing 21 has a plurality of circumferentially disposed inlets 30 for a corresponding plurality of circumferentially disposed inlet passages 31 into which the hot brine rising through the open lower end of the well casing 1 is delivered.

Inlet passages 31 communicte with spaced upper suction inlet 32 and lower suction inlet 33 for the respective upper pumping chamber 34 and lower pumping chamber 35. The upper pumping chamber 34 discharges through spaced outlets 36a and 36b and the lower pumping chamber discharges through spaced outlets 37a and 37b respectively into the annular collecting chamber 29 which communicates with the annular discharge outlet 27 for the turbine-impeller pump 10.

The hot brine entering through inlets 30 and inlet passages 31 is pumped from the suction inlets 32 and 33 through the respective pumping chambers 34 and 35 to the spaced outlets 36a, 36b, 37a and 37b by spaced composite driving-pumping impellers as at 38 and 39 which are mounted on a rotor assembly generally designated 40 so that they lie respectively in the pump chambers 34 and 35 as will now be described.

ROTOR ASSEMBLY

The rotor assembly 40 has both pumping components and hydraulic driving components thereon. The spaced composite impellers 38 and 39 forming the pumping components are disposed on opposite sites of the horizontal center line through the rotor assembly 40 and act to pump the hot brine delivered to the suction inlets 32 and 33 for the pumping chambers 34 and 35. They are spaced and so assembled that hydraulic pumping forces acting in the hot brine being pumped will be balanced. Similarly two multi-stage axial flow driving assemblies 41 and 42 which are substantially mirror images of each other are disposed on the rotor assembly 40 on opposite sides of the medially disposed and spaced composite impellers 38 and 39. Hot brine is delivered into opposite ends of the multi-stage axial flow assemblies 41 and 42 and flow therethrough in opposite directions so that the hydraulic forcs acting in the hot brine driving fluid are also balanced during operation of the turbine-impeller pump.

The effect of this construction is to balance the axial thrust load and direction within predictable limits so that a relatively simple thrust balancing assembly can be used to balance the direction thereof to maintain the rotor assembly in position when the turbine-impeller pump 10 is in operation.

The central or medial portion of the rotor assembly 40 is provided with an annular elongated central hub and spacer 43. The composite impellers 38 and 39 are provided with hubs as at 44 and 45 which are threadably connected at one end respectively to opposite sides of the annular central hub and spacer 43.

The annular hub and spacer disposes the rotor assembly for free rotation about a hollow cylindrical stator or axle 46 which defines a central flow passage 47 from end to end through the central axis of the turbine-impeller pump 10. The hollow cylindrical axle 46 is threadably connected to a lower support spider 48 which is connected in the lower casing 22 in operative association with turning vanes as at 48a disposed in the turning passages 48b in communication with the flow passage 47 defined by the hollow cylindrical stator 46. Similarly at the upper end an upper spider support 49 engages the upper end of the hollow cylindrical stator 46 as is clearly shown in FIG. 2 of the drawings.

Composite impellers 38 and 39 have central partitions as at 50 and 51 which extend radially outward from the hubs 44 and 45. Front or inner shrouds 52 and 53 on the respective composite impellers are disposed adjacent the respective suction inlets 32 and 33 and pump vanes 54 connecting the front shroud 52 and central partition 50 and pump vanes 55 connecting the front shroud 53 with the central partition 51 define pump passages 54a and 55a for pumping hot brine from the suction inlets 32 and 33 respectively to the outlets 36a and 36b for the pump passage 34 and 37a and 37b for the pump passage 35 whenever the impellers 38 and 39 are rotated. Thus, means are provided for delivering the hot brine to the annular collecting chamber 29, connected in turn to deliver the hot brine to the passages 27 and 28 for discharge through the main discharge outlet 4 for the system.

Working in unison on the rotor assembly 40 and disposed on the respective opposite sides of the composite impellers 38 and 39 remote from the pumping sides thereof as above described, are the multi-stage axial flow assemblies 41 and 42.

FIG. 2 shows that on the sides of the composite impellers 44 and 45 remote from the front shrouds 52 and 53, back support members or shrouds are provided as at 60 on composite impeller 38 and 61 on composite impeller 39.

Turning or guide vanes 62 disposed between back shroud 60 and central partition 50 of composite impeller 38 and turning or guide vanes 63 disposed between the back shroud 61 and central partition 51 of composite impeller 39 form radial flow passages 64 in the composite impeller 38 and radial flow passages 65 in the composite impeller 39. Radial flow passages 64 act to turn and pass the hot brine motive fluid from the discharge end of multi-stage axial flow assembly 41 and radial flow passages 65 act to turn and pass the hot brine motive fluid from the discharge end of multi-stage axial flow assembly 42 respectively to the discharge outlets 36a, 36b, 37a and 37b for the pumping chambers 34 and 35 where the recirculated hot brine motive fluid joins and is discharged with the hot brine being pumped to the annular collecting chamber 29. The mixture then flows upwardly through annular flow passages 27 and 28 to the main discharge outlet 4 for the system.

Since the hot brine motive fluid is not substantially lower in temperature than the temperature of the hot brine being pumped and further represents about 50% of the total volume of the hot brine passing out through the main discharge outlet 4, the energy losses due to the differences in temperature of the fluid delivered does not materially effect the overall efficiency of the turbine-impeller pump 10 or the system in which it is used.

Upper multi-stage axial flow driving assembly 41 on the rotor assembly 40 has an annular support 68 threadably connected as at 69 to the section of the back shroud 60 adjacent the hub 44 of the composite impeller 38 so that the respective axial flow rotor blades 70, 71 and 72 can be shouldered in series against the inner end or face 73 of the back shroud 60 and locked in position by an upper rotor blade locking nut 74 on the end of the annular support 68 remote from the back shroud 60.

Annular stator blades 75, 76 and 77 which coact with the serially connected axial flow driving rotor blades 70, 71 and 72 are connected in an upper annular countersunk groove 78 on the hollow cylindrical axle 46 so that they engage the upper annular shoulder 79 and are fixed in assembled position by a spacer 80 and the upper end locking nut 81.

The upper rotor blades locking nut 74 has a radially extending outward taper and defines with the spacer 80 an annular inlet 82 for delivering hot brine motive fluid.

Similarly the upper end locking nut 81 has a radially outward taper which defines an inlet port 83 for hot brine motive fluid to be delivered through the central bore 47 and the turning flow passages 48b to the inlet passage for the lower multi-stage axial flow driving assembly 42 hereinafter described.

The upper end locking nut 81 has a lesser diameter than the inner wall of the inner conduit 7 and since it lies concentric to the vertical line of the turbine-impeller pump 10 within the conduit 7 will cause motive fluid delivered by the inlet conduit 7 to be split so that one portion is delivered through the annular inlet 82 for the upper multi-stage axial flow driving assembly 41 on rotor assembly 40 and the other portion passes through the inlet bore 83 for delivery through the central bore 47 to the lower multi-stage axial flow driving assembly 42 as will now be described.

Similar to upper multi-stage axial flow assembly 41, the lower multi-stage axial flow driving assembly 42 also has an annular support as at 85 threadably connected as at 86 to the section of the back shroud 61 adjacent to the hub 45 of the composite impeller 38 so that the respective axial flow driving rotor blades 87, 88 and 89 can be shouldered in series against the inner end or face 90 on the back shroud 61 and locked in assembled position by the lower rotor blades locking nut 91.

The annular stator blades 92, 93 and 94 which coact with the serially connected rotor blades 88 and 89 are mounted in the lower annular countersunk groove 95 on the hollow cylindrical axle 46 so they engage the lower annular shoulder 96 and are fixed in assembled position by a spacer 97 and the lower locking nut 48 which holds the lower end of the hollow cylindrical axle 46 in assembled position relative the upper casing 20, middle casing 21 and lower casing 22 of the turbine-impeller pump 10.

The lower rotor blades locking nut 91 defines with the lower locking nut 48 and spacer 97 an annular inlet flow passage 98 for the axial flow driving rotors 87, 88 and 89 of the lower multi-stage axial flow driving assembly 42. The annular inlet flow passage 98 communicates through the turning passages 48b with the central bore 47 through which the hot brine motive fluid is delivered to the multi-stage axial flow driving assembly 42.

Figure 4:
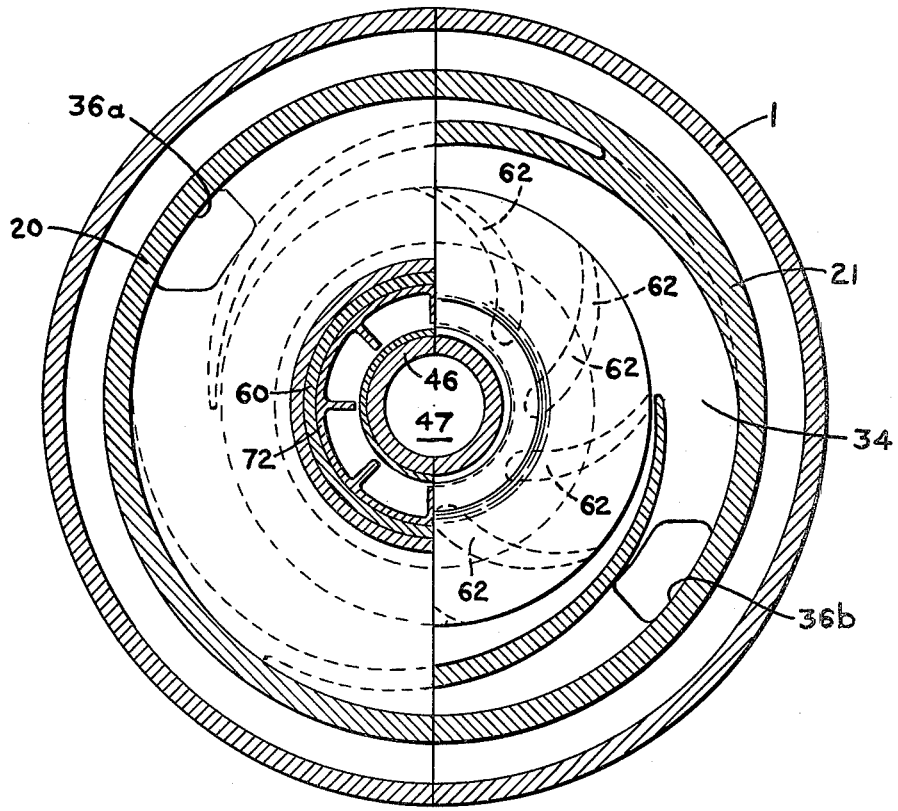
FIG. 4 is a horizontal cross-section taken at line 4—4 of FIG. 2 showing the lower pumping chamber and discharge passages.

FIG. 4 shows that the inlet for the radial flow passages 64 communicates with the discharge side of the upper axial flow driving rotor blades 70, 71 and 72 and this hot brine motive fluid in the radial flow passage 64 will be discharged into the pumping chamber 34 with the hot brine being pumped through the pumping side of the composite impeller 38.

Similarly, the radial flow passages 65 communicate with the discharge side of the lower axial flow driving rotor blades 87, 88 and 89 and hot brine motive fluid passing through the radial flow passages 65 will be discharged with the hot brine fluid being pumped by the pumping side of the composite impeller 39.

BEARING ASSEMBLIES AND SEALS

Since the respective upper and lower multi-stage axial flow driving assemblies 41 and 42 are disposed to substantially balance the axial thrust forces developed during the driving of the composite impellers 38 and 39 only a single thrust bearing generally designated 100 is required for any residual thrust due to the weight of the rotor and the small predictable axial thrust that will develop because of the difference in the flow paths and other factors during the operation of the turbine-impeller pump 10.

A suitable lubricating system must be provided to maintain the thrust bearing assembly 100, upper sleeve bearing 101 and lower sleeve bearing 102 clean so that the rotor assembly 40 will continue to rotate freely on the hollow cylindrical axle 46 during the operation of the turbine-impeller pump 10.

FIG. 2 shows that the thrust bearing assembly 100 includes an annular thrust bearing flange or collar 105 which is formed about the end of the annular support 60 and extends radially outward therefrom for operative association with a fixed upper cylindrical thrust bearing pad 106 and a fixed lower cylindrical thrust bearing pad 107 respectively mounted in an annular thrust bearing cavity 108 formed in the upper casing 20. Annular thrust bearing cavity 108 has a diameter sufficiently larger than the outer diameter of the annular thrust bearing collar 105 that an annular chamber 109 is formed which communicates freely with the upper clearance space 100 between the upper face of the annular thrust bearing collar 105 and the upper thrust bearing pad 106 and with the lower clearance space 111 between the lower face of the annular thrust bearing collar 105 and the lower thrust bearing pad 107. Motive fluid which enters upper clearance space 110 an lubrication fluid which enters lower clearance space 111 is free to travel to the annular chamber 109 when the rotor assembly 40 is being driven by the upper and lower multi-stage axial flow driving assemblies 41 and 42 thereon.

In order to maintain the bearing surfaces functional, it is necessary to lubricate both the thrust bearings and the sleeve bearings for the turbine-impeller pump 10. Since the fluid being pumped is hot brine; clear filtered water can be utilized as the lubricating fluid for this purpose.

Thus lubricant fluid in the form of clear filtered water is delivered from a reservoir 112 by a pump 113 to the surface end of a lubricant conduit 114 which extends inside the full length of the outer column 2 in the annular pumping passage 28 between the outer column 2 and the inner column 7 where the lower end thereof connects to the lubricant inlet port 114a at the upper end of a main lubricant passage generally designated 115 formed in the upper casing 20, central or middle casing 21 and lower casing 22 when these casings are assembled to each other.

The main lubricant passage 115 communicates with an upper branch passage 116 and a lower branch passage 117.

The upper branch passage 116 communicates through a side connecting conduit 118 for the thrust bearing assembly 100 and a side conduit 119 for the sleeve bearing 101. The side conduit 118 communicating with a common manifold 120 which feeds a plurality of ports 121 on the face of the lower thrust bearing pad 107 so that lubricant fluid is continually fed into the lower clearance space 111.

Figure 5:
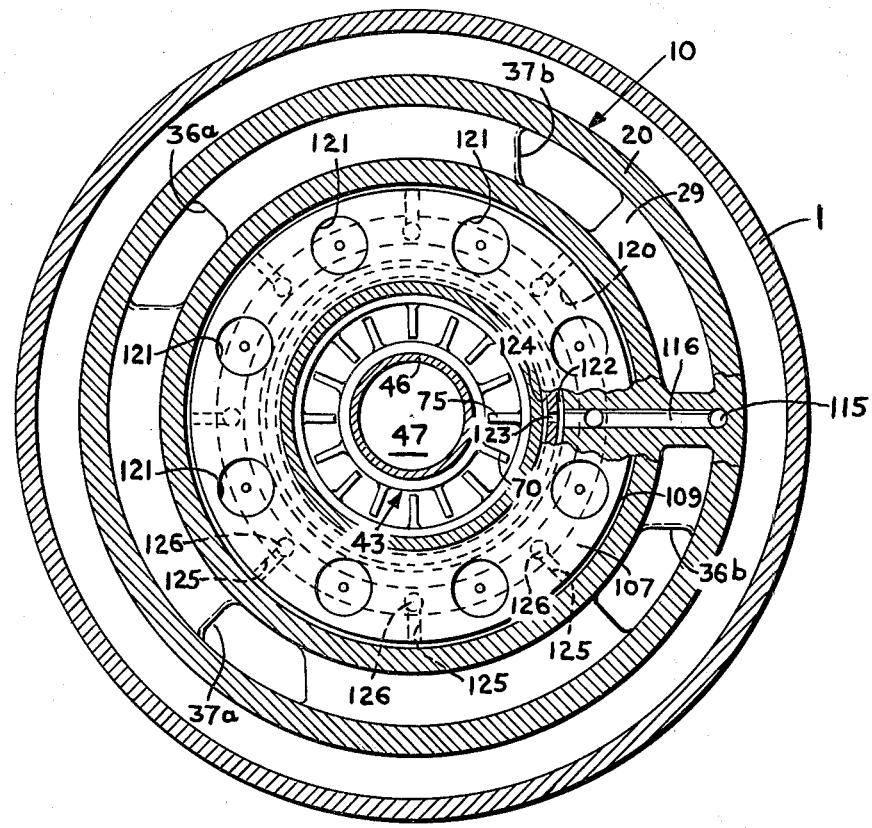
FIG. 5 is a horizontal cross-section taken at line 5—5 of FIG. 2 showing the lubricating assembly for the thrust bearing.

The side conduit 116 communicates with a common annular chamber 122 which in turn communicates through a plurality of circumferentially disposed ports 123 with the inner face 124 of the sleeve bearing 101. The lubricant fluid from the lower clearance space 111 which flows to the annular chamber 109 will pass through circumferentially spaced connecting passages 125 and waste passages 126 in communication with pumping chamber 34, as is shown in FIG. 5.

Lubricant fluid which is delivered to the inner face 124 of the sleeve bearing 101 flows downwardly into pumping chamber 34 and upwardly to the lower clearance space 111 to join with lubricant fluid lubricating the upper face of the bearing pad 107 and is collected and passed therewith through the annular chamber 109 and passages 125 and 126 to the pumping chamber 34.

Those skilled in the art will recognize that the pressure of the lubricant fluid will be sufficiently great that it will balance the axial thrust of the rotor assembly 40 and thus maintain the rotor assembly in a substantially fixed position during operation of the turbine-impeller pump 10.

Since operating conditions vary there will be some limited oscillation of the rotor assembly 40 and to seal the upper end of the rotor assembly at the point where the hot brine motive fluid enters the upper multi-stage axial flow driving assembly 41 a suitable seal 128 such as a labyrinth seal will be provided to limit the leakage of such motive fluid. The portions of the motive fluid which does leak through the seal 128 will pass through the upper clearance space 110 to the annular chamber 109 and will join and be discharged with the lubricant fluid from the upper clearance space 111 through passages 125 and 126 to the pumping chamber 34, all of which is also shown by FIGS. 2 and 5 of the drawings.

In a similar manner, the lower branch conduit 117 communicates with the annular chamber 130 which feeds a plurality of circumferentially disposed ports 131 in the lower sleeve bearing 102 in communication with the inner surface 132 of the lower sleeve bearing 102.

The lubricant fluid flows upwardly along the inner wall 132 of sleeve bearing 102 to the pumping chamber 35 and downwardly along inner wall 132 to a collecting chamber 133. Waste return passage 133 passes the lubricant fluid to the pumping chamber 35 where it is mixed and delivered with the hot brine being pumped by the turbine-impeller pump 10.

A lower seal as at 134 such as a labyrinth seal is provided to limit leakage of hot brine motive fluid from the lower end of passage 47. The seal 134 is disposed so that leakage fluid can be passed to the collecting chamber 133 and from chamber 133 will pass with the lubricant fluid through waste return passage 133 to the pumping chamber 35.

It will be understood by those skilled in the art that the amount of lubricant fluid or the leakage of motive fluid is negligible so that it will have not significant effect on the temperature of the hot brine being pumped by the turbine-impeller pump 10.

OPERATION

In operation, the lubricant pump 113 is started and lubricant fluid is fed from the reservoir 112 through lubricant delivery conduit 114 to the lubricant port 114a and the main lubricant delivery conduit 115. From main delivery conduit 115 the lubricant fluid flows through the passages and ports to the lower bearing pad 107, and the sleeve bearings 101 and 102 as above described.

Pump 9 is then started and priming fluid such as clear filtered water is utilized to initially commence the rotation of the rotor assembly 40. Once the system is operating pump 9 will draw hot brine motive fluid and recirculate the same down the conduit 7 to the turbine-impeller pump 10 for use in the further driving operation of the rotor assembly 40 as has been above described, one portion passing to the upper motive fluid inlet 82 for delivering motive fluid to the upper multi-stage axial flwo driving assembly 41 and another portion passing through inlet port 83 for the central flow passage 47 for delivering motive fluid through inlet passage 98 to the lower multi-stage axial flow driving assembly 42.

When the rotor assembly 40 is in operation hot brine will be drawn through the suction inlets 32 and 33 by the respective composite impellers 38 and 39 and pumped via pump chambers 34 and 35 to the respective outlets 36a, 36b, 37a and 37b to the annular collecting chamber 29 and thence upwardly through annular passages 27 and 28 to the main discharge outlet 4 for this form of geothermal energy recovery system.

At the surface the hot brine will be passed generally to some form of heat exchange apparatus not shown, where the heat is recovered. The cool waste brine is then passed to return wells, also not shown where it is recharged into the ground and reconditioned for further recovery of heat therefrom by the same recovery system.

The corrosive and erosive character of the hot brine require that the casing, rotors, bearings and seals of the turbine-impeller pump receive special consideration. In this regard the casings can be made of titanium alloys or chromium-molybdenum-nickel alloys such as those sold on the open market under the trademark "HASTALLOY". The turbine blades and stators can be made of stellite, the bearings of an impregnated carbon such as carbond impregnated with glass fibers, or nylon or Teflon etc. The seals in the form of labyrinth seals may be made of high stainless steel alloys with tungsten carbide as an aluminum oxide or chromium oxide coatings thereon. These examples are only by way of illustration and those skilled in the art will recognize that there are other choices of materials capable of meeting the difficult conditions of operation which are imposed on the equipment when hot brine is being pumped.

It will be understood that the invention is not to be limited to the specific construction or arrangement of parts shown but that they may be widely modified within the invention defined by the claims.

What is claimed is:

1. A turbine-impeller pump for pumping fluids comprising:
   a. casing means having spaced pumping chambers and each of said pumping chambers having, a suction inlet, and discharge outlet means,
   b. a hollow axle means fixedly connected in the longitudinal axis of the casing and defining end to end therethrough a motive fluid passage,
   c. rotor means mounted for free rotation about said axle means includes, spaced composite impellers thereon in assembled position of the rotor to lie respectively in said spaced pumping chambers for pumping fluid therethrough to the respective discharge outlet means,
   d. said rotor means also having a first multi-stage axial flow driving assembly on one side of the spaced composite impellers and a second multi-stage axial flow driving assembly on the opposite side of the spaced composite impellers,
   e. means for delivering motive fluid to said casing and to pass one portion of said motive fluid to the inlet end of the first driving assembly and another portion of said motive fluid through the motive fluid passage in the axle means to the inlet end of the second driving assembly whereby the rotor means will be hydraulically balanced during the operation of the turbine-impeller pump.

2. In a turbine-impeller pump as claimed in claim 1 including,
   a. thrust bearing assembly for balancing residual axial thrust developed during operation of the pump,
   b. said thrust bearing assembly including, a thrust bearing collar connected to said rotor means, and
   c. lubrication means on said pump for lubricating the thrust bearing assembly.

3. In a turbine-impeller pump as claimed in claim 2 wherein,
   a. said composite impellers each include, a suction eye in communication with the suction inlet for the pumping chamber to receive fluid to be pumped, and
   b. the respective eye of each of the composite impellers disposed to face each other when the rotor means is in assembled position on the axle means.

4. In a turbine-impeller pump as claimed in claim 2 wherein,
   a. each of said composite impellers includes, a suction eye in communication with the suction inlet for the associated pumping chamber to receive fluid to be pumped, a central partition, pump vanes on one side of said central partition defining pumping passages in communication with said suction eye for the impeller, a back shroud having a back opening on the side of the central partition remote from the suction eye, and radially extending turbine blades between said back shroud and said central partition to define radial discharge passages for discharging motive fluid with the pumped fluid from the respective composite impeller, and
   b. the respective suction eye of each of said composite impellers disposed to face each other when the rotor means is in assembled position on the axle means.

5. In a turbine-impeller pump as claimed in claim 4 wherein,
   a. said first driving assembly is connected to the back shroud of one of said composite impellers, and
   b. the second driving assembly is connected to the back shroud of the other of said composite impellers but on the side of the rotor means opposite from that of the first impeller, and
   c. the discharge end of said first driving assembly communicating with the back opening in the associated back shroud, and the discharge end of the second driving assembly communicating with the back opening of its associated back shroud for passing motive fluid from the first driving assembly and second driving assembly to the composite impellers.

6. In a turbine-impeller pump as claimed in claim 2 wherein,
   a. the thrust bearing assembly is located adjacent one end of the rotor means,
   b. said thrust bearing assembly including a thrust bearing cavity having a diameter slightly greater than the diameter of the thrust bearing collar for collecting lubrication fluid when the thrust bearing is in operation, and
   c. return passage means connected at one end to said collecting chamber formed by said thrust bearing cavity and at the end remote therefrom with one of said pumping chambers to pass lubrication fluid therethrough for discharge with a mixture of pumped fluid and motive fluid passing therethrough.

7. A turbine-impeller pump for pumping fluids comprising,
   a. casing means having a first pumping chamber and a second pumping chamber disposed in spaced relation to each other in the medial section thereof, said first pumping chamber and second pumping chamber each respectively having a suction inlet for receiving fluid to be pumped, and discharge outlet means for said pumped fluid,
   b. said casing means having a main discharge means for the pumped fluid,
   c. the dicharge outlet means respectively for said first pumping and second pumping chamber being offset from each other and connected at the end remote therefrom to the main discharge means,
   d. an elongated hollow axle means fixedly connected in the casing and extending through the pumping chamber along the longitudinal axis thereof, said axle means defining end to end therethrough a motive fluid passage,
   e. rotor means including, a medially disposed hollow spacer for mounting the rotor for free rotation about the axle means, a first composite impeller and a second composite impeller connected to opposite ends of said spacer so that in the assembled position of the rotor on the axle the first composite impeller will be in the first pumping chamber and the second composite impeller will be in said second pumping chamber, f. first multi-stage and flow driving assembly on said rotor connected to said first composite impeller, g. second multi-stage axial flow driving assembly on said rotor connected to said second composite impeller on the side thereof opposite from said first driving assembly, h. said first driving assembly having first inlet means for motive fluid and said second driving assembly having second inlet means for motive fluid, i. conduit means connected to said casing and disposed to pass motive fluid directly to said first inlet means and to pass motive fluid through said motive fluid passage in the axle means to said second inlet means, j. a thrust bearing assembly on said rotor means for absorbing residual axial thrust developed during the operation of said pump, and k. lubrication means on said pump connected to deliver lubricant fluid to said thrust bearing assembly.

8. In a turbine-impeller pump assembly for pumping fluids as claimed in claim 7 including, return conduit means connected at one end to said thrust bearing assembly and at the opposite end to said pumping chamber for passing lubricant fluid from the thrust bearing assembly.

9. In a turbine-impeller pump for pumping fluids as claimed in claim 8 wherein;

a. said first composite impeller has a central partition, a pumping section and a radial discharge flow section on opposite sides of said central partition, b. said first driving assembly having the dishcarge end thereof disposed to deliver motive fluid to the radial discharge flow section on the fluid composite impeller, and c. said second composite impeller has a central partition, a pumping section and a radial discharge flow section on opposite sides of the central partition for the second composite impeller, and d. said second driving assembly having the discharge end thereof disposed to deliver motive fluid to the radial discharge flow section on the second composite impellers, and e. said thrust bearing assembly disposed adjacent to the inlet end of the first driving assembly.

10. In a geothermal energy recovery system the combination with a supply well disposed in a geothermal energy field of:

a. outer column means disposed to extend into said supply well, b. inner column means disposed to extend inside said outer column means and concentric thereto to define therewith a discharge flow passage and to define end to end therein an inlet flow passage for motive fluid, c. a turbine-impeller pump connected respectively to the lower end of the outer column means and inner column means including, a suction inlet for fluid to be pumped from said supply well, an inlet assembly for motive fluid, and a common discharge outlet for pumped fluid and motive fluid connected to said discharge flow passage, d. pumping means for recirculating a portion of the pumped fluid mixture from the discharge flow passage to the inner column means for providing motive fluid for driving said turbine-impeller pump, e. said turbine-impeller pump having a hollow central axle fixedly connected therein and rotor means mounted for free rotation about said central axle and said central axle defining a motive fluid passage therethrough, f. said rotor means including, pumping assembly means and driving assembly means, and g. said driving assembly means including, a first multistage axial flow driving assembly on one side of the pumping assembly and a second multi-stage axial flow driving assembly on the opposite side of the pumping assembly whereby the axial forces acting in said turbineimpeller pump during operation thereof will be hydraulically balanced.

11. In the combination for a geothermal energy recovery system as claimed in claim 10 wherein, a. said turbine-impeller pump includes a thrust bearing assembly for balancing residual axial thrust developed during operation of the pump, b. said thurst bearing assembly includes, a thrust bearing collar connected to said rotor means, and c. said turbine-impeller pump has lubrication means for lubricating the thrust bearing assembly, and d. pump means connected to a source of lubricant and including a conduit disposed to extend between the outer collar means and inner collar means for connection to the turbine-impeller pump to pass lubricant to said lubricating means therein.

12. A rotor assembly for a turbine-impeller pump including, a. a central annular spacer, b. a first composite impeller connected to one end of said annular spacer, and a second composite impeller connected to the opposite end of said annular spacer, said first composites impeller and said second composite impeller disposed a predetermined spaced distance from each other, c. said composite impellers respectively including pumping sections having suction inlets disposed to face each other in assembled position on the annular spacer, and radial discharge flow passages respectively on the sides of the composite impellers remote from the respective pumping sections thereon, d. first multi-stage axial flow driving assembly rotor blades connected to the side of first composite impeller adjacent to the radial flow passages thereon, and second multi-stage axial flow driving assembly rotor blades on the side of the second composite impeller opposite from said first rotor blades and adjacent to the radial passages on the second composite impellers, and e. said rotor in assembled position in said turbine-impeller pump to provide hydraulic balancing of the axial forces acting therein during the operation of said pump.

13. In a rotor assembly for a turbine-impeller pump as claimed in claim 12 including, a thrust bearing collar connected to said first driving rotor.

14. The combination with a rotor assembly for a turbine-impeller pump as claimed in claim 12 of, a. a fixed hollow cylindrical axle disposed in the central axis of said turbine-impeller pump for mounting the rotor assembly thereon for free rotation about said cylindrical axle, b. a plurality of first multi-stage axial flow driving assembly stators disposed in said turbine-impeller pump to cooperate with said said first driving assembly rotor blades, and c. a plurality of second multi-stage axial flow driving assembly stators disposed in said turbine-impeller pump to cooperate with said said second driving assembly rotor blades.

15. In a turbine-impeller pump for pumping fluids as claimed in claim 12 including, a. a first seal at one end of said rotor adjacent the first multi-stage axial flow driving assembly to limit leakage of motive fluid from said end of the rotor assembly, b. a second seal at the opposite end of said rotor adjacent the second multi-stage axial flow driving assembly to limit leakage of motive fluid from said opposite end of the rotor assembly, and c. passage means for passing leakage fluid from the turbine-impeller pump.

* * * * *